W. F. TAYLOR.
STUDENTS' CHAIRS.

No. 187,680. Patented Feb. 20, 1877.

Witnesses:
C. Clarence Poole
A. H. Evans.

Inventor:
William F. Taylor
per attys
A. H. Evans & Co.

UNITED STATES PATENT OFFICE.

WILLIAM F. TAYLOR, OF MEDINA, NEW YORK.

IMPROVEMENT IN STUDENTS' CHAIRS.

Specification forming part of Letters Patent No. 187,680, dated February 20, 1877; application filed January 9, 1877.

*To all whom it may concern:*

Be it known that I, WILLIAM F. TAYLOR, of Medina, New York, have invented a new and useful Improvement in Students' Chairs, of which the following is a clear, full, and exact description, reference being had to the accompanying drawings as a part of this specification, in which—

Figure 1:
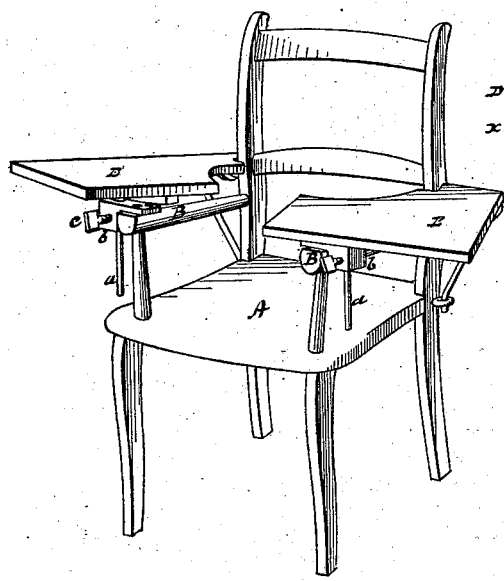
Figure 2:
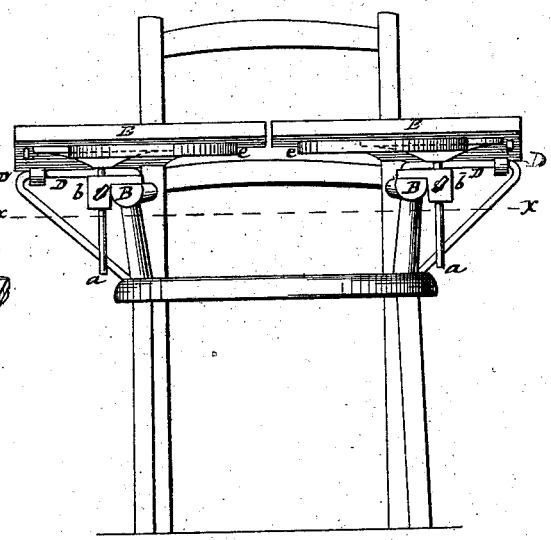
Figure 3:
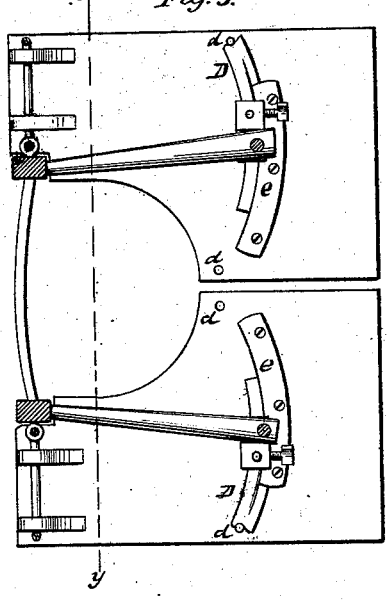
Figure 4:
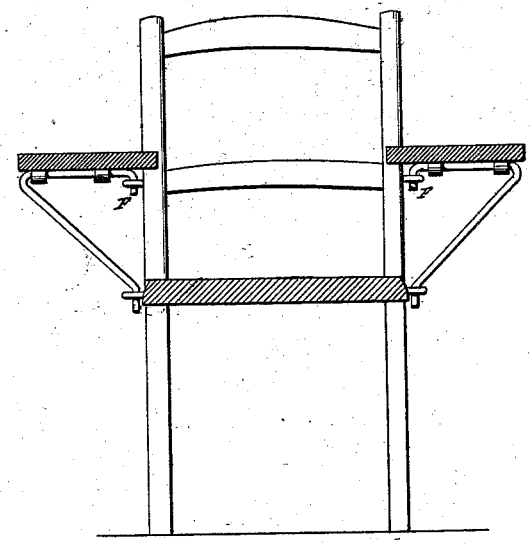

Figure 1 is a perspective view of a chair with my improvements attached. Fig. 2 is a front view of the same. Fig. 3 is a section through $x\ x$, Fig. 2; and Fig. 4 is a section through $y\ y$, Fig. 3.

My invention relates to that class of chairs used by students and others for reading and writing; and it consists in the combination of devices hereinafter described and claimed.

To enable others to make and use my invention, I will proceed to describe the exact manner in which I have carried it out.

In the drawings, A represents a chair, provided with arms B B. On the ends of these arms are secured brackets $b\ b$, through which are made perforations to receive the sliding stems $a\ a$. These stems are held in any desired position by means of the thumb-screws $c\ c$. On the tops of these stems are secured the curved horizontal supports D D, on which rest the leaves E E. These leaves are provided on their under side with curved cleats $e\ e$, corresponding in curve with the horizontal supports D D, and inclosing the outer edges of the latter, so as to form a groove, by means of which the leaves are attached to the supports, while at the same time the curve allows the pivoted leaves to partially revolve, the amount of revolution being determined by the stops $d\ d$ on the leaves, which come in contact with the supports as the leaves are opened or closed. The rear part of the leaves is attached to the rear posts of the chair by means of the hinge F, as shown in Fig. 4, or by any other conveniently-arranged hinge which will allow the forward ends of the leaves to be moved vertically and horizontally.

It is evident from this description that by means of the vertical and lateral adjustment of the leaves E E my improved chair can be made to accommodate itself to any occupant, and thus form an easy and comfortable rest for the student.

Having thus explained my invention, what I claim as new, and desire to secure by Letters Patent, is—

The chair A, provided with the arms B and brackets $b\ b$, in combination with the leaves E, provided with the cleats $e\ e$, and the supports D D, provided with the stems $a\ a$, all constructed to operate substantially as and for the purpose set forth.

WILLIAM F. TAYLOR.

Witnesses:
 LEWIS J. IVES,
 EBER HUBBARD.